(12) United States Patent
Lucas (10) Patent No.: US 6,713,112 B1
(45) Date of Patent: *Mar. 30, 2004

(54) MEAL COOLER CENTRIFUGAL SEPARATOR

(75) Inventor: Richard V. Lucas, Jordan, MN (US)

(73) Assignee: Scott Equipment Company, New Prague, MN (US)

( * ) Notice: Subject to any disclaimer, the term of this patent is extended or adjusted under 35 U.S.C. 154(b) by 316 days.

This patent is subject to a terminal disclaimer.

(21) Appl. No.: 09/804,180

(22) Filed: Mar. 12, 2001

(65) Prior Publication Data (65)

Related U.S. Application Data (63) Continuation-in-part of application No. 09/659,909, filed on Sep. 12, 2000, now abandoned.

(51) Int. Cl.⁷ .............................................. B01D 45/14
(52) U.S. Cl. .................. 426/524; 426/463; 426/486; 55/406; 55/423; 55/430; 55/462; 96/359
(58) Field of Search ................. 426/524, 463, 426/493, 486, 622; 95/216–220, 223–225, 228–230; 96/281–283, 301, 322, 332, 368, 386; 55/400, 406, 423, 430, 462

(56) References Cited

U.S. PATENT DOCUMENTS

| 879,219 A | 2/1908 | Towns |
| 950,607 A | 3/1910 | Baldwin |
| 2,040,700 A | 5/1936 | Magaton ............... 261/93 |
| 2,460,008 A | 1/1949 | Heller ................. 241/38 |
| 2,770,543 A | * 11/1956 | Arnold et al. |
| 2,857,612 A | 10/1958 | Fischer ............... 15/256.5 |
| 3,629,994 A | 12/1971 | Jones ................. 55/20 |
| 3,677,478 A | 7/1972 | Schutte ............... 241/82 |
| 3,772,847 A | 11/1973 | Houtman et al. ...... 55/92 |
| 3,973,735 A | 8/1976 | Ito et al. ............ 241/73 |
| 4,076,177 A | 2/1978 | Hirayama et al. ..... 241/32 |
| 4,129,260 A | 12/1978 | Baker ................. 241/46 |
| 4,131,247 A | 12/1978 | Danberg .............. 241/49 |
| 4,149,859 A | 4/1979 | Vigesdal ............. 55/89 |

(List continued on next page.)

FOREIGN PATENT DOCUMENTS

| DE | 33 17 572 A1 | 11/1983 |
| DE | 33 33 898 A1 | 4/1985 |
| WO | 95/23625 | 9/1995 |

OTHER PUBLICATIONS

Scott Brochure, "Continuous Process Equipment", (date unknown).
U.S. patent application Ser. No. 09/659,909, Lucas, filed Sep. 12, 2000.

Primary Examiner—Milton I. Cano
Assistant Examiner—Robert Madsen
(74) Attorney, Agent, or Firm—Vidas, Arrett & Steinkraus, P.A.

(57) ABSTRACT

A particulate capture system having a plurality of high speed rotating paddles for separating particulate from an air stream. The system includes an air circulating chamber within a centrifuge that separates a first portion of particulate trapped within an air stream. The particulate capture system also has a blender section that separates a second portion of particulate trapped within the air stream. The first portion of particulate is separated via circulating air flow. The second portion of particulate is separated via encapsulating the particulate in water. The water encapsulated particles may be recirculated to a cooler or other device where the particulate may be blended with a bulk product being processed.

13 Claims, 5 Drawing Sheets

U.S. PATENT DOCUMENTS

| | | | |
|---|---|---|---|
| 4,213,571 A | * 7/1980 | Deardorff et al. | |
| 4,308,037 A | 12/1981 | Meissner et al. | 55/10 |
| 4,767,066 A | 8/1988 | Williams | 241/27 |
| 4,830,291 A | 5/1989 | Williams | 241/73 |
| 4,874,402 A | 10/1989 | Vogel | 55/22 |
| 4,940,334 A | 7/1990 | Musil | 366/4 |
| 5,062,575 A | 11/1991 | Barnabie et al. | 241/73 |
| 5,136,791 A | 8/1992 | Fraile et al. | 34/57 |
| 5,199,653 A | 4/1993 | Durrant et al. | 241/73 |
| 5,271,163 A | 12/1993 | Pikus et al. | 34/33 |
| 5,378,265 A | 1/1995 | Pearl | 95/219 |
| 5,526,988 A | 6/1996 | Rine | 241/23 |
| 5,570,517 A | 11/1996 | Luker | 34/424 |
| 5,641,338 A | 6/1997 | Brookman | 95/213 |
| 5,681,371 A | 10/1997 | Carr | 95/204 |
| 5,887,808 A | 3/1999 | Lucas | 241/82 |
| 5,902,250 A | * 5/1999 | Verrier | 261/84 |

* cited by examiner

MEAL COOLER CENTRIFUGAL SEPARATOR

CROSS-REFERENCE TO RELATED APPLICATIONS

This application is a Continuation-In-Part application of U.S. patent application Ser. No. 09/659,909, filed Sep. 12, 2000 now abandoned.

STATEMENT REGARDING FEDERALLY SPONSORED RESEARCH

Not Applicable

BACKGROUND OF THE INVENTION

1. Field of the Invention

This invention relates to a meal rendering process and apparatus. More particularly, the present invention relates to a process and apparatus that facilitates efficient recovery of particulate matter which becomes airborne as a result of a product being exposed to industrial cooling or drying processes. An example of such a cooling or drying process is during the rendering process and production of meat meal, where the meat product is heated to a temperature of approximately 270 degrees Fahrenheit The meat meal product is extruded or pressed and is placed into a counter air flow cooler which draws a counter flowing air stream over the meat meal product thereby reducing the temperature of the meat product to approximately 130 degrees Fahrenheit. However, the air stream tends to draw a significant amount of particulate meat meal away from the cooling product. The suspended product, as picked up by the air stream, may be comprised of between 10 and 15 percent fat. The present invention is directed to the use of a unique negative air pressure separator which utilizes a self evacuating centrifugal separator and water blender, which when an air stream is drawn therethrough, will recover approximately 99.9 percent of any airborne particulate from the air steam. The present invention is particularly useful for separating viscous or sticky particulate, such as the aforementioned fat particulate, from an airstream without plugging or otherwise interfering with the functioning of the separator.

2. Description of the Related Art

As mentioned above, meat meal rendering processes are known which utilize high temperature cooking to remove bacteria and to soften meat, fat, bones, skin and the like. The rendering process generally produces a soft, pliable dry product which contains approximately 10 percent moisture content. Upon completion of the rendering process the dry product will have a temperature of approximately 260° Fahrenheit (126° Celsius) and a fat content of approximately 30 percent. The cooked product is then transferred to a press such as a tapered extruder where much of the fat content is squeezed out from the meat meal product through small holes in the press. However, pressing the meat meal alone is insufficient for extracting all of the fat content from the product as about 10 to 15 percent of the fat remains in the product.

In prior meat rendering processes, the heated and pressed meat meal product is typically moved to a cooler where it is exposed to a stream of ambient air which is intended to cool the meat product. Ambient air in contact with the meat meal within the cooler normally increases in temperature to over 200 degrees Fahrenheit before the air exits the cooler. The heat exchange between the air stream and the product also results in moisture being drawn away from the product, with the moisture being contained in the air stream well below the dew point. The particulate which remains in the air stream as it exits the cooler may be detected by people in the form of an unpleasant odor.

Devices have been used in conjunction with coolers in an attempt to prevent or control particulate build up and to remove particulate content from the air stream in a controlled manner. Devices such as a conventional centrifuge or cyclone, bag houses and other types of separators have been employed using a number of configurations and methods. Unfortunately these prior devices and methods fail to separate particulate from the air stream to a desired level of efficiency and fail to address the problems associated with particulate build up. For example the oily particulate tends to build up in cyclones forming oily plugs, the rotary air lock on the discharge of cyclones likewise plug. Oily particulates also tend to buildup on the interior walls of conventional centrifuge devices causing plugging. Furthermore, the oily nature of the product renders a bag house inoperable. In addition, because the prior systems fail to separate out a sufficient percentage of particulate from the air stream, odor emitted from expelled air continues to be a problem.

In many rendering systems, the aforementioned problems associated with ambient air coolers are avoided by merely not using a cooler with the rendering system. In such rendering processes the hot meal product is handled directly. As a result of direct handling of the product, condensation occurs around the product thereby providing a warm moist environment for bacterial growth, such as salmonella, to occur. Obviously, in such processes odor remains a significant problem.

In view of the foregoing it is clear that a separator is needed having the capability to efficiently and effectively capture the particulate that is picked up in the air stream of current rendering/cooling processes. A device is needed which provides the desired particulate separation efficiency and which may be added to existing meat rendering processes.

BRIEF DESCRIPTION OF THE INVENTION

In view of the above, the present invention is directed to an apparatus and system which addresses the shortcomings of known meat meal rendering processes and associated apparatus, as generally known and described above. The present invention provides for a unique centrifugal separator and water blending chamber which may be utilized with a processing system such as the meat rendering system cooler described above or with other processing systems such as a hammer mill. In at least one embodiment of the invention, the present apparatus may be connected to a cooling system such as previously discussed by connecting the air stream outlet of the cooler to the centrifugal separator of the present invention. The centrifugal separator removes the majority of air borne particulate present in the air stream. Following the centrifugal separator, the air stream may then be directed through a separator plate and into a blender section where the air flow may be exposed or blended with water to encapsulate any particulate remaining in the air stream. The water with encapsulated particles may then be recycled through the cooler or other associated system.

The present invention is directed to a method and apparatus which uses a unique air stream centrifuge and water blender design which not only separates suspended particles from an air stream, but which also includes a means for removing the particles from the apparatus itself, thereby preventing buildup of separated material which could otherwise interfere with the operation of the separator. The present invention may be incorporated into existing rendering and/or cooling systems, replacing and/or supplementing prior separator mechanisms such as cyclones or bag houses.

The present invention is a negative pressure system which draws an air stream through a centrifugal chamber and a water blending chamber. In the centrifugal chamber a plurality of longitudinally mounted radially extending paddles rotate at high speed drawing the air stream into the chamber and forcing the air stream to circulate in a manner similar to a centrifuge. This centrifuge effect causes the majority of particulate suspended in the air stream to be separated out and to collect on the inside wall of the chamber. The circulating paddles effectively scrape the collecting particulate from the wall of the chamber preventing build up. The paddles themselves have a unique configuration which when rotating at speed provide the desired centrifugal effect upon the air stream without subjecting the air stream to disruptive turbulence. In addition, the paddles' design is such that particulate tends not to collect or build up on the paddle surface. The rotating action of the paddles directs the scraped particulate matter through a gated aperture which extends the length of the chamber. The gate allows the scrapped particulate matter to be pushed out of the chamber when the gate is in the open position, thereby preventing continuous build up of particulate.

The scrapped particulate matter is gravity dropped from the gate and into a collection area where a trough screw advances the particulate matter to an outlet port. Initially, the particulate matter is dropped into a hopper 66, which serves as a collection area The trough screw 70, is proximate to the bottom of the hopper 66, and extends beyond the hopper 66, and into the horizontal chamber 68, which is preferably a tube. The transition of the hopper 66, into a tube of the horizontal chamber 68, facilitates the formation of a cylindrical plug and air seal for the meal cooler centrifugal separator. The trough screw 70, and the housing within which it is contained, are constructed and arranged such that the particulate matter is allowed to accumulate and form a plug which blocks air from entering the system. The plug is advanced and simultaneously maintained by the continuous build up of particulate matter behind the advancing plug. By plugging the outlet port in this manner the invention is able to maintain a negative pressure air flow without back drafting from the outside air. The matter which comprises the plug is continuously pushed to the exit and replaced by material that follows, thus assuring that no static material remains in the system. The plug system is utilized because the product is non free-flowing and is too high in fat content to work in a rotary air lock.

After the air stream has passed through the centrifugal chamber the air stream passes through a separator plate and into a water blending chamber or blender. The separator plate allows the air stream to pass therethrough but restricts passage of particulate thus providing for further particulate separation. Within the blender the air stream is passed through water which is injected into the blender through one or more water injection ports. The water is mixed with the air stream to encapsulate the remaining particulate in water, which is then passed out of the blender and into a collection tank. The water is mixed with the air stream with a plurality of paddles similar to those which are in the centrifugal chamber such as are described above.

After passing through the water blending chamber the air stream is directed onto water to encapsulate particles remaining in the air stream. The air stream is directed in this manner by a diverter plate or baffle which directs the air stream toward and/or onto the water thus encapsulating particles in the air stream which were previously wetted in the blender. Passage of the air stream over the water and particulate mixture provides an additional mixing opportunity between the water and air to separate any remaining particulate suspended in the air stream. The air stream is then pulled by a fan which releases the air stream into the atmosphere being approximately 99.9 percent or more particulate free. The water encapsulated particles may be pumped back to the cooler and injected onto the product as it passes through the cooler. Due to the high temperature of the meal product the water directed to the cooler will mostly evaporate thus depositing any particulate back into the product. This closed loop circulation of water allows the user to control and add moisture to the product as desired.

The present method and apparatus provides for a system which increases the efficiency of particulate collection and minimizes odor by removing most particles from the air stream. Additionally the present invention provides for a system which allows for moisture lost to a cooling, drying or other process to be replaced by recirculating moisture through a closed loop system for return to the original product during processing.

The present invention may be embodied in a variety of unique systems and apparatus such as those described in detail below. The invention may be retrofitted to an existing meal processor or may be included in new processor designs as well.

BRIEF DESCRIPTION OF THE SEVERAL VIEWS OF THE DRAWINGS

A detailed description of the invention is hereafter described with specific reference being made to the drawings in which:

FIG. 1 is a diagrammatic representation of a prior art particulate retrieval system;

FIG. 2 is a diagrammatic representation of an embodiment of the inventive process viewed in association with a counter air-flow cooling system;

FIG. 3 is a partially cut-away perspective view of an embodiment of the apparatus;

FIG. 4 is a cut-away side view of the embodiment shown in FIG. 3;

FIG. 5 is an exposed end view of an embodiment of the invention;

FIG. 6 is a detail perspective view of one embodiment of the paddles utilized by the present invention;

FIG. 7 is a cut-away detailed side view of a portion of the invention shown in FIG. 2, illustrating the operation of a trough screw and advancing plug; and FIG. 8 is a diagrammatic view of an embodiment of the present invention as may be utilized with a hammer mill.

DETAILED DESCRIPTION OF THE INVENTION

As indicated above the present invention is directed to an apparatus for separating particles from an air stream. The air stream may be the air stream derived from a cooler, a rendering system, a hammer mill, a dryer, or any other type of processing system where particulate matter may be picked up by an air stream.

In accordance with the present invention, the preferred embodiments described herein are capable of recovering about 99.9% or more of the particulate that are captured by the air stream, even where the particulate matter at issue is viscous, sticky, oily or otherwise difficult to separate and collect.

Figure 1:
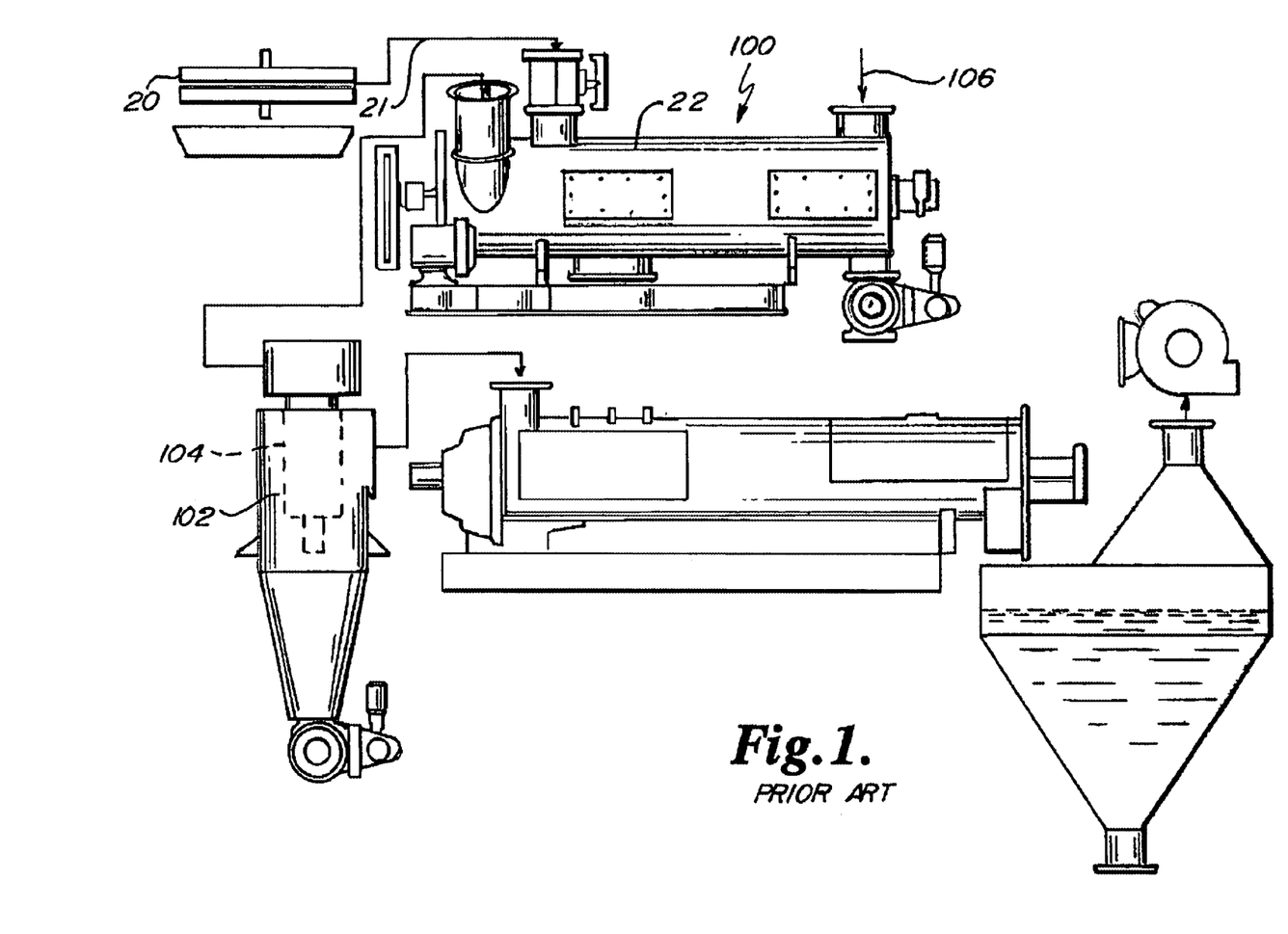

FIG. 1, illustrates one embodiment of a prior art meat meal rendering and cooling system 100 used to capture particulate trapped in an air stream. As may be seen, the system 100 utilizes a cyclone or other capture device 102 in association with a counter air flow meat meal cooler 22. In the process shown, an air stream 106 is passed over a meal product which causes particulate 104 to become suspended therein. In order to filter the particulate 104 out of the air stream 106, so as to reduce air borne odor, the air stream is run through the cyclone 102. In a meat rendering process, the particulate 104 suspended in the air stream 106 tends to be extremely oily due to a relatively high content of fat. The fat content plus the extreme heat of the meal product makes it difficult to separate particulate 104 from the air stream 106. A cyclone 102 may be used to perform particulate capture functions from an air stream having between ten to twelve percent fat content but even in an air stream having the aforementioned fat percentages, the cyclones 102 do not remove sufficient quantities of the particulate 104. In addition, cyclones 102 will not properly function where fat content is greater than approximately 12 percent. Due to the oily, viscous nature of the fat particulate and because such prior art systems are not self evacuating or self-cleaning as the present invention is, cyclones 102 tend to plug from the particulate 104 which builds up therewithin, thereby rendering the cyclone 102 as well as the entire system 100 inoperable.

Normally, 10% to 15% of the cooled product 21 is captured by the cooling air stream 106 and exits the cooling system 22 as trapped particles 104. In the prior art system shown, the particulate matter which is captured in such a system may be discharged at the bottom of the cyclone 102 where it may be packaged or dealt with as desired. An example of such a particulate capture system which employs a cyclone is disclosed in U.S. patent application Ser. No. 09/303,871 entitled PARTICULATE CAPTURE SYSTEM AND METHOD OF USE, filed May 3, 1999, the entire contents of which being incorporated herein by reference.

Figure 2:
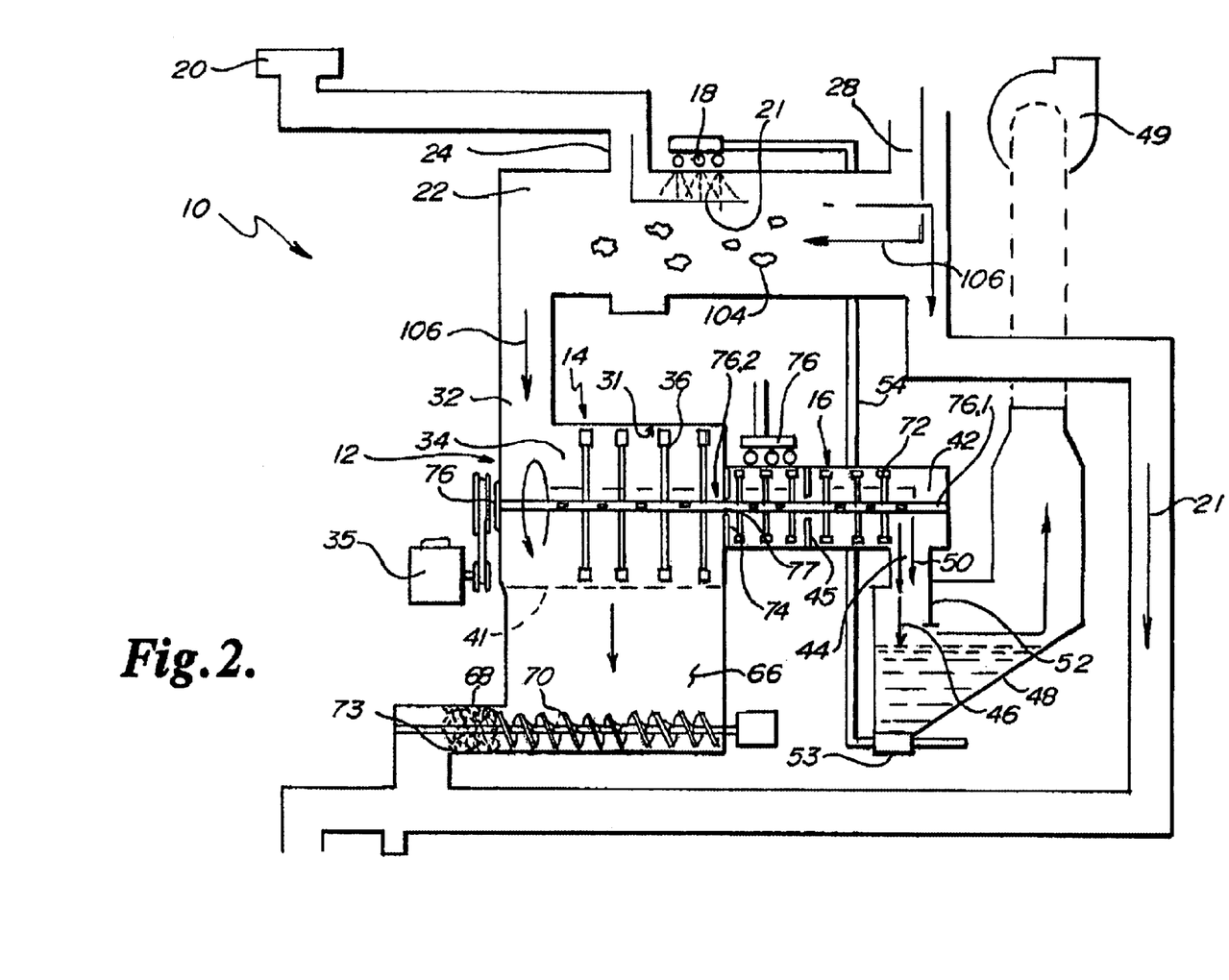
Figure 3:
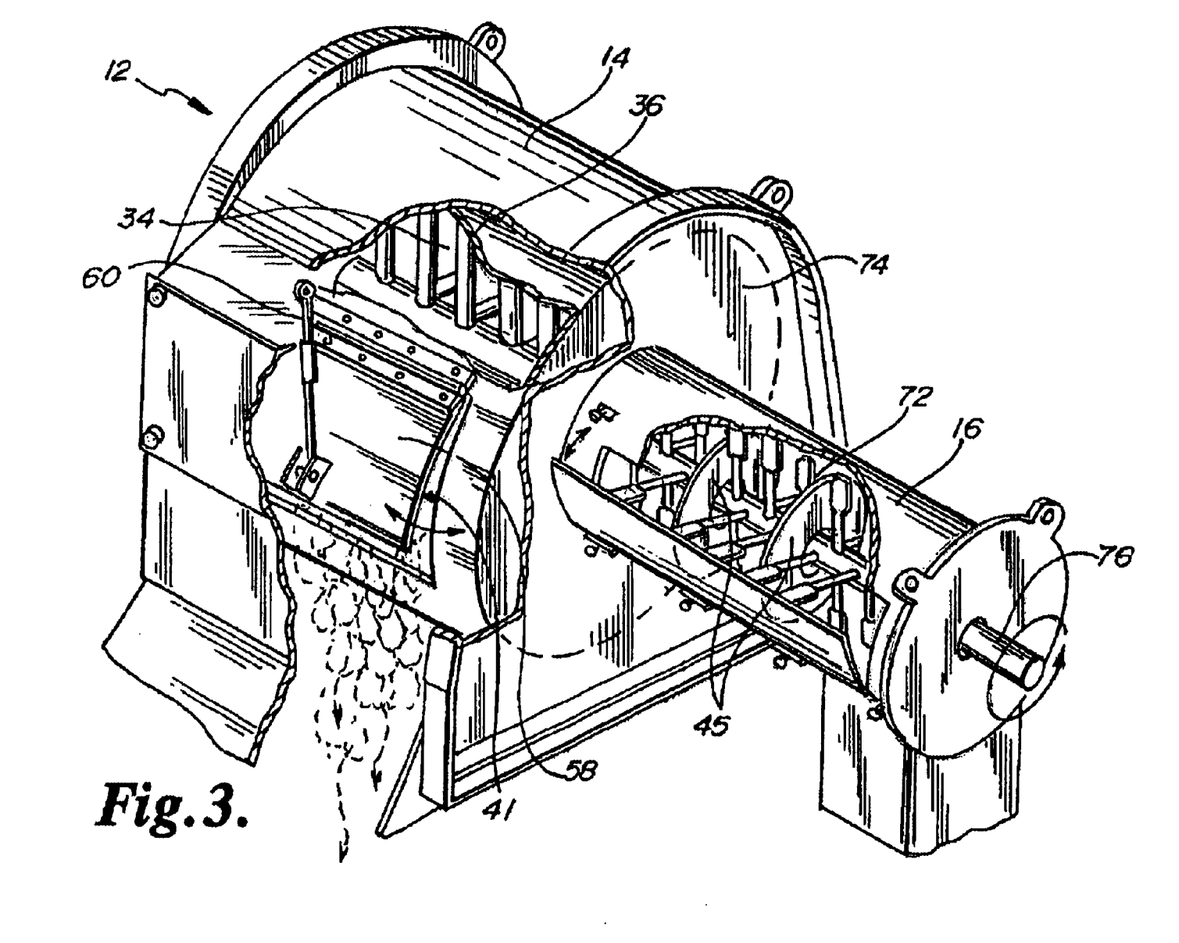

Turning to FIG. 2, a modern particulate capture system 10, is shown which employs an embodiment of the particulate separator 12 of the present invention. The particulate separator 12 is in functional communication with a closed cooler system 22 and replaces the cyclones and/or separators 102 of the prior art system 100 shown in FIG. 1 The particulate separator 12 of the present invention includes a unique centrifugal separator 14 and a specialize high speed blender or agitator 16 which are utilized in a unique arrangement so as to initially separate out the majority of the particles 104 from the air stream 106 and then encapsulate any remaining particulate 104 of the air stream 106 in water 18 that is subsequently reprocessed to capture nearly 100% of the particulate.

As is known, many current rendering processes include a cooking process to soften the meal which is subsequently passed through an extruder or press 20 such as may be seen in the system 10 shown in FIG. 2. As previously discussed however, it should be noted that the present invention may be utilized with a variety of processes of which many do not include a press or even a necessarily rendered product. In the prior art embodiment shown in FIG. 1, the press separates approximately 85% to 90% of the fat portion of the meal, the remaining portion of the meal product 21 being transported to the closed cooler system 22. Cooler systems such as the one presently shown may be a counter flow cooler such as a Scott Cooler System manufactured by Scott Equipment Company of New Prague, Minn. In the present context the term cooler may also include any of a variety of apparatus such as concurrent air flow driers or other devices which pass an air stream over a product.

In the present embodiment shown in FIG. 2, the cooler system 22 employs a stream of ambient air in combination with water that is injected on to the product 21. The injected water 18 provides the invention with the enhanced cooling benefits while simultaneously increasing the moisture content of the meal product 21 to a desired level. In an embodiment directed to a meat rendering process, the cooked meat meal product 21 leaving the press 20 is quite dry, having only about 2½% to 3% moisture content. Generally, this cooked meat meal product 21 also exits the press 20 at a temperature of about 260 degrees Fahrenheit and having a fat portion consisting of about 10% to 15% of the total rendered product.

It may be seen that the cooked dry product enters the cooler system 22 at a product entry port 24 near one end while the air stream 106 enters the cooler system 22 through an air entry port 28 located at the opposite end of the cooler system 22. As the cool air 106 is pulled through the cooler system 22, it passes over the cooked product 21 that is moving in the opposite direction to produce a counter flow condition between the cooling air 106 and the cooked product 21. During this counter flow condition, particulate 104 (which may include a significant portion of fat) within the cooked product 21 are undesirably mixed with the cooling air 106 which exits the cooling system 22.

The general function of the present separator 12 may best be understood when viewed in the context of the process 10 shown in FIG. 2. It can be seen that after the air stream 106 passes over the product 21, the air stream 106 enters the present separator 12 at an inlet port 32. A more detailed explanation of the present particulate capture system 10 and the associated particulate separator 12 will be described herein below with reference to FIGS. 3–6.

Generally, the air stream 106 is drawn into the air chamber 34 via the air inlet port 32. The air stream 106 is drawn into the chamber 34 as a result of the negative pressure supplied by the fan 49 and the high speed rotation of a plurality of air paddles 36 and 72 which are mounted to a longitudinally oriented drive shaft or axle 76. As is clear from the embodiments shown in FIGS. 3–6, the drive shaft 76 extends entirely through the air centrifuge separator or section 14 as well as the blender section 16. As may also be seen in FIGS. 3 and 4, paddles 36 are located within the centrifuge separator or section 14 and paddles 72 are positioned within the blender 16. Due to the relative size of the chamber 34 within the centrifuge 14 and the blender 16, the air paddles 36 are longer than air paddles 72.

In an alternative embodiment, the centrifuge 14 may be adjacent to and separated from the blender 16. In this embodiment, a first drive shaft or axle 76 may traverse the centrifuge 14 and a second drive shaft or axle 76.1 may traverse the blender 16. Each of the first and second drive shafts 76 and 76.1 respectively may be engaged to an independent motor, engine, and/or rotational mechanism 35 which may be coupled to impart rotational motion through pulleys, gears, or other rotational means. In this embodiment, bushings and/or bearings are preferably positioned for support and engagement to the respective drive shaft 76, 76.1 to facilitate rotation within each of the centrifuge 14 and/or blender 16. The rotation of each drive shaft 76 and 76.1 is therefore not required to be synchronized and/or identical in speed between the centrifuge 14 and/or blender 16. Each of the separator 14 and/or blender 16 is required to include an opening 76.2 to permit air passage therebetween. The opening 76.2 may be the same size or a different size than the separator plate 74 to provide restrictive or less restrictive air flow. A channel and/or air passage may also extend between the centrifuge 14 and blender 16 to provide air flow communication via the opening 76.2. Preferably the channel and/or air passage between the centrifuge 14 and blender 16 has a short longitudinal dimension to minimize clogging therein. The centrifuge 14 and/or blender 16 are also preferably positioned in as close of a proximity to each other as possible without creating interference between the bearings, bushings, and/or rotation of the first drive shaft 76 relative to the second drive shaft 76.1. In this embodiment, the opening 76.2 and the air channel/passage may be preferably positioned towards the upper end walls of each of the centrifuge 14 and/or blender 16 opposite to the aperture 41. The positioning of the air channel/passage upwardly away from the aperture 41 preferably minimizes risk of clogging with air born particulate 104. The air passage/channel extending between the centrifuge 14 and/or blender 16 may also include quick release coupling mechanisms to facilitate disassembly and cleaning and/or replacement as desired by an individual. The separation of the centrifuge 14 and the blender 16 preferably reduces risk of shaft deflection which may occur during rotation at certain speeds which may vary dependent upon the length of the shaft. For example, when a longitudinal dimension of the centrifuge 14 and blender 16 increases, it is preferable to incorporate a dual drive shaft 76, 76.1 embodiment to reduce shaft deflection especially during rotation at increased speeds.

Figure 4:
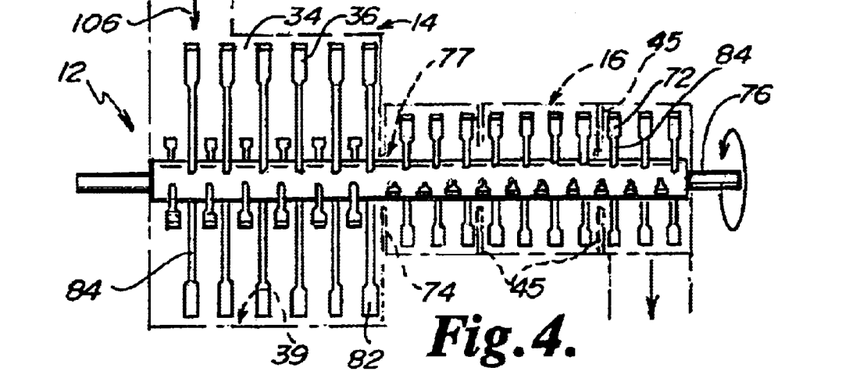
Figure 6:
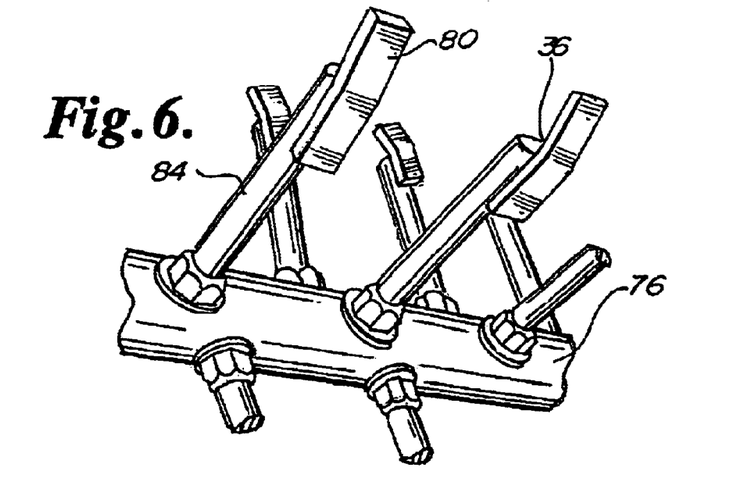
Figure 7:
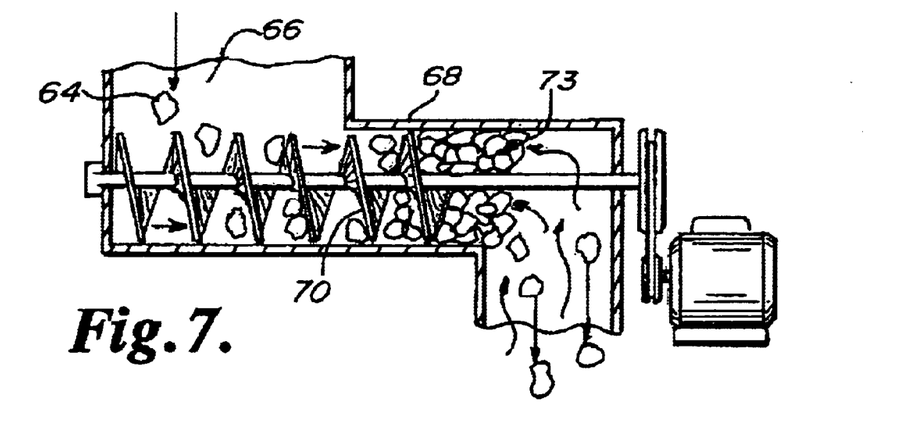
Figure 8:
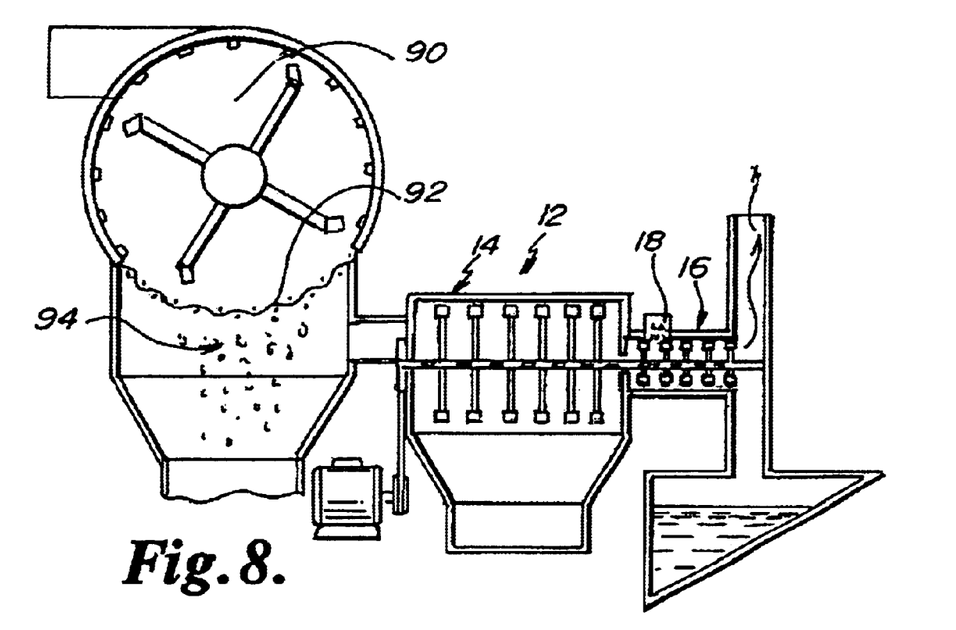

As may best be seen in FIG. 4, the paddles 36 and 72 of the present invention may be seen to have a unique construction. The paddles 36 and 72 are designed to scrape and to prevent particulate material 104 from collecting in the chamber 34. An additional property of the paddles 36 is that the paddle faces 80, (which are the sides of the paddles which actively push against the air during rotation) have a fairly narrow width 82. The paddles 36 may be between ¼ of an inch to over 2 inches in width. In the embodiment shown the paddle faces 80 have a width of ½ an inch. In at least one embodiment, as shown in FIG. 6, the paddles faces 80, of the paddles 36 are angled between substantially 10° and 25° degrees relative to the support shaft 84 which connects the paddle face 80 to the drive shaft 76. In the case of the centrifuge 14, the angled paddle face provides the paddles 36 with increased ability to push particulate 104 into the aperture 41. The paddles 72 within the blender 16 may be configured to have faces 80 which are angled in any manner desired by the user. In the embodiment shown, the faces 80 are angled relative to the support shafts 84 in the same manner as the paddles 36 in the centrifuge 14, though such an arrangement is not required in the blender 16.

In the embodiment shown the paddles 36 and 72 are arranged about the shaft 76 or 76.1 in an opposingly offset manner as shown. The offset arrangement of the paddles 36 or 72 have been found to provide improved air flow and rotational balance as the shaft 76 or 76.1 is rotated. In alternative embodiments paddles 36 or 72 may be arranged in any manner desired by the user. A detailed description of alternative rotatable air paddles (hammers/beaters) which may be adapted for use with the present particulate separator 12 is presented in U.S. Pat. No. 5,887,808, entitled High Efficiency Grinding Apparatus, issued Mar. 30, 1999 to Richard V. Lucas. U.S. Pat. No. 5,570,517, entitled Slurry Dryer, issued Nov. 5, 1996, to William A. Luker, assigned to the same assignee as the present invention, also describes paddles or blades on a rotating shaft which may be modified for inclusion in the present invention. Both references are incorporated by reference herein in their entirety.

Figure 5:
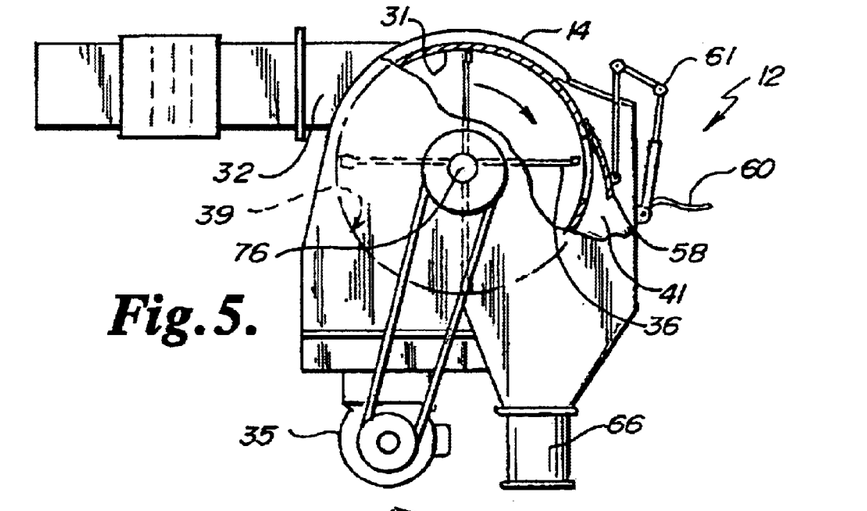

As may be seen in FIG. 5 drive motor 35 rotates the drive shaft 76 or 76.1, and therefore the air paddles 36 and 72, at a rotational rate between approximately 400 and 2300 rpm. The drive motor 35 may be any type of drive mechanism known and may engage the drive shaft 76 or 76.1 by belt, chain, hydraulic or other means. The rotating action of the paddles 36 within the centrifuge 14 forces the particulate 104 of the air stream 106 radially outward causing the majority of the particulate 104 to collect on the inside wall 31 of the centrifuge 14.

In FIGS. 2–4, it may be seen that the centrifuge 14 may be characterized in general as a substantially hollow, cylindrical shaped structure. The centrifuge 14 includes an air inlet port 32 which is where the air stream 106 enters the chamber 34. Extending the length of the centrifuge 14, the inside wall 31 has an aperture 41. The aperture 41 may be covered by a curved gate 58 (not visible in FIG. 2, see FIGS. 3 and 5) which is shaped to follow the contour of the curve of the inside wall 31 of the centrifuge 14.

During operation, the drive shaft 76 spins the paddles 36 so as to create a radially acting force on the air stream 106. This force causes a significant portion of the particulate 104 to be separated from the air stream 106. If the particulate is not sticky or viscous, the particulate will be directed into the aperture 41 as a result of the radially acting force. If the particulate 104 sticks to the inside wall 31 of the centrifuge 14, which is often the case, the paddles 36 are of sufficient length to "scrape" any accumulating particulate matter off of the inside wall 31 and into the aperture 41. Where the particulate 104 is particularly sticky, the aperture 41 may begin to clog. To prevent this, the gate 58, as shown in FIGS. 3 and 5 may by closed at predetermined times to allow the paddles 36 to contact and scrape any accumulation of particulate matter off of the gate 58. The gate 58 is once again opened to allow the particulate 104 to be directed for passage into the aperture 41. The opening and closing of the gate 58 may be done manually by actuation of a lever 60. Alternatively the gate 58 may be opened and closed by hydraulic or electronic actuators, or a series of mechanical linkages 61 as may be desired. Such an actuator may also be controlled by a timing mechanism for periodic opening and closing of the gate 58.

As may be seen in FIG. 2 and in FIG. 7, the collected matter which passes through the aperture 41, falls into a collector 66. The collector 66 includes substantially horizontal chamber 68 which contains a trough screw 70. As the particulate matter 64 is deposited into the collector 66, the trough screw 70 continuously draws the matter into and through the chamber 68. As may be seen however, the trough screw 70 has a length which is shorter than the length of the chamber 68. The difference in lengths between the trough screw 70 and the chamber 68 allows matter to accumulate and form a solid plug 73 of continuously advancing matter. The motion of the trough screw 70 continues to provide new matter to the plug 73 thereby continuously pushing the plug 73 out of the chamber 68 where it may be continuously fed into a storage vessel or other apparatus. The plug material 73 may also be directed to a conveyor or other apparatus which will recombine the plug material with the original product 21, as may be seen in FIG. 2, as desired by the user. The trough transitions into a tube and/or horizontal chamber 68 upon exit from the collector 66, to facilitate the formation of a cylindrical plug of material which, in turn, functions as an air seal.

The formation of a plug 73 functions as an air lock to prevent reverse air passage into the blender section 16 and/or the centrifuge section 14, such as are shown in FIG. 2. The plug 73 of material ensures that air, other than the air stream 106 drawn in through the inlet port 32, is prevented from entering the system. This allows a negative pressure to be maintained within the chamber 34 which ensures that air stream 106 is properly drawn through the entire separator 12 for maximum particulate removal.

With reference to FIGS. 2 it may be seen that after passing through the centrifuge section 14 of the chamber 34, the air stream 106 is drawn into the blender section 16. A separator plate 74 is positioned between the blender 16 and the centrifuge 14. The separator plate 74 substantially restricts the chamber 34 by providing a circular plate which substantially blocks the passage between the centrifuge 14 and the blender 16 but which has one or more openings 77 to allow the air stream 106 to pass therethrough. The separator plate 74 reduces the opening between the centrifuge 14 and the blender 16 by one to two inches or more relative to the diameter of the smaller blender section 16 as shown. By restricting the passage between the centrifuge 14 and blender 16, the separator plate 74 ensures that larger particulate 104 and collected particulate matter are prevented from entering into the blender 16.

After passing through the centrifuge 12 and separator plate 74, the air stream 106 is substantially particulate free. Once the air stream 106 has entered the blender 16, one or more water injection nozzles 78 may inject water 18 into the blender 16. The paddles 72 of the blender section 16 mix the air stream and water together, thereby encapsulating most, if not all, of the remaining particulate 104 in water. The blender 16 may also include one or more regularly spaced weir plates 45 to further restrict air passage for exposure to water. The blender 16 preferably includes fluid removal passages to which permit fluid flow past the weir plates for inclusion within the closed water system. The water 18 passing through the injection nozzles 78 and into the blender 16 may also be treated with a deodorizing agent such as chlorine, detergents, perfumes, and/or any other mixed liquid odor masking agent which may be safe for consumption by animals. The introduction of an odor masking and/or deodorizing agent preferably further reduces the odors which are inherent in the air stream and air particulate 104 which passes below the director plate 52 for discharge into the atmosphere. The masking and/or deodorizing liquid introduced into the blender 16 may also be collected within the muddy water 46 and storage tank 48 to reduce and/or mask odor therein. The deodorizing liquid may then be recycled into the closed loop water system for pumping to the cooler 22 to reduce the undesirable odors associated with the hot meat meal as cooled within the cooler 22.

Water encapsulated particles or "muddy water" 46 exit the blender 16 at end 42 through a water discharge port 44. Muddy water 46 is preferably released into a liquid storage tank 48. Meanwhile the air stream 106 is directed out of the blender 16 through a discharge port 50 and is directed into the storage tank 48. A baffle or director plate 52 restricts the air flow to ensure that the air stream 106 passes over the surface of the muddy water 46 stored in the tank 48. The director plate 52 may be manually and/or mechanically raised or lowered relative to the surface of the muddy water 46 within the storage tank 48. Manual adjustment means may include adjustable levers having a plurality of positioning stops and/or rotatable hand wheels connected to screws and/or gears. Alternatively, the director plate 52 may be adjustably raised and/or lowered relative to the surface of the muddy water 46 via an electronic motor at the discretion of an individual. The adjustment of the height of the director plate 52 relative to the surface of the muddy water 46 may therefore be utilized to regulate air flow passage and the contact of airborne particulate 104 exiting the blender 16 for contact with the exposed surface of the muddy water 46. It should be noted that the director plate 52 may be lowered and/or raised dependent upon the elevation of the muddy water 46 within the tank 48 so long as an air flow communication passage remains open. The passage of the air flow into/over the muddy water 46 allows for an additional interface for encapsulating any particulate 104 which may be suspended in the air stream. After passing through the tank 48 the air stream is substantially free from suspended particulates 104 and may be released into the atmosphere via fan 49.

The muddy water 46, may be recirculated back into the system 10 by pumping or otherwise transporting the muddy water 46 back to the cooler 22. Alternatively, the muddy water 46 may be passed to a drain and/or sewer pipe for disposal at the preference of an individual.

In at least one embodiment, a diaphragm pump 53 and water pipe 54 may be used to transport the muddy water 46 back to the cooling system 22, where the muddy water 46 is injected into the cooling system 22 near the dry product entry port 24 such that it may be mixed with the bulk hot dry product 21 during the cooling process.

The present inventor has found the present embodiment useful in removing odor from the air stream that is optionally and subsequently released to the atmosphere. Since the air stream has already been cleaned via the centrifuge 14 and blender 16, in the particulate capture system 12, little, if any residue is left in the air stream.

Due to its high efficiency, it has been found that the novel particulate separator 12 of the present invention will produce the desired results without necessitating the need for a cyclone 102 (as seen in FIG. 1). Therefore, a more preferred embodiment of a process 10 for recapturing particulate, e.g. fat laden particulate, eliminates the cyclone 102 such that the cooling system 22 may be coupled directly to the present particulate separator 12 via the aforesaid inlet port 32.

In the embodiment shown in FIG. 8, the separator 12 may be seen in use with a hammer mill 90. In this embodiment the separator 12 may be used in association with a hammer mill, to provide an air flow assist which will draw air borne particles 94 out of and through the mill screen 92. The air borne particles 94 may then be processed by the centrifuge 14 and blender 16 in the manner described above. In such an embodiment, it may be desirable to forego the use of recirculated water in the blender 16. If this is desired, the water 18 from the blender 16 may be disposed of rather than recirculated. Alternatively the use of the blender 16 may be omitted at the preference of a user.

Test results have shown that the disclosed particulate capture system 10 successfully removes 99.9997% of air borne particulate 104 when no water is added and 99.99992% when water is added through the water injection nozzle 78.

The testing was conducted by Mostardi-Platt Associates, Inc., (Mostardi Platt) which performed a particulate emissions engineering test on the particulate capture system 10 at the New Prague, Minn. plant of Scott Equipment Company.

The purpose of this test was to quantify emissions of Total Suspended Particulate (TSP) 104 matter during two different operating conditions. During the first test, a "dry" product was fed through the system. During the second test, water was added to the system.

The results of this test program are summarized in Table 1.

TABLE 1

|  | No Water Added | Water Added |
|---|---|---|
| Filterable TSP | 0.811 lb/hr | 0.170 lb/hr |
| Aqueous Condensible TSP | 0.061 lb/hr | 0.045 lb/hr |
| Organic Condensible TSP | 0.012 lb/hr | 0.012 lb/hr |
| Total TSP | 0.854 lb/hr | 0.227 lb/hr |

The unit operating data recorded during the test are presented in Table 3.

Visible amounts of particulate matter 104 were observed on the filters from both test runs. This particulate matter 104 could be characterized as two distinct types, differing in color and size. One type was a relatively light brown in color, and fairly fine (small and symmetrical in size). The other type was a relatively dark brown in color, and coarse (large and irregular in size).

The dark brown particulate matter was material that had previously accumulated on the inside of the system exhaust stack and was blown off the stack walls during the test. The light brown particulate matter represented emissions from the dryer/separator process during the test. It appeared that there was relatively more of the dark brown matter present on the filter for the first test run than for the second.

All testing, sampling, analytical, and calibration procedures used for this test program were performed as described in the Title 40, *Code of Federal Regulations, Part* 60 (40 C.F.R. 60), Appendix A, Methods 1 through 5; and 40 C.F.R. 51, Appendix M, Methods 102A and 202 and the latest revisions thereof Where applicable, the *Quality Assurance Handbook for Air Pollution Measurement Systems,* Volume III, Stationary Source Specific Methods, United States Environmental Protection Agency (USEPA) 600/4-77-027b was used to determine the precise procedures.

Moisture was determined in accordance with Method 4, 40 C.F.R. 60.

During the test 100 grams of water were added to each of the first two impingers and the third was left empty. An impinger containing approximately 150 grams of silica gel was attached following the third impinger. The entire impinger train, excluding the inlet and outlet connectors, was weighted to the nearest 0.5 gram. The impingers were placed in an ice bath to maintain the temperature of the gas passed through the silica gel impinger below 68° F. Samples were collected concurrently with, and as an integral part of Method 5 sampling.

After each test run, a leak check of the sample train was performed at a vacuum greater than the sampling vacuum to determine if any leakage had occurred during sampling. Following the leak check, the impingers were removed from the ice bath and allowed to warm. Any condensed moisture on the exterior was removed and the train re-weighed.

A single test point, located in the center of the exhaust duct was utilized.

The particulate sample train was manufactured by Nutech Corporation of Durham, N.C. and meets all specifications required by Method 5, 40 C.F.R. 60. A glass-lined probe was used. Velocity pressures were determined simultaneously during sampling with a calibrated S-type pitot tube and inclined manometer. All temperatures were measured using K-type thermocouples with calibrated digital temperature indicators.

The filter media were Whatman 934-AH glass micro-fiber filters exhibiting a ≧99.97% efficiency on 0.3 micron DOP smoke particles in accordance with ASTM Standard Method D-2986-71. All sample contact surfaces of the train were washed with HPLC reagent-grade acetone. These washes were placed in sealed and marked containers for analysis.

Sample recovery was performed in the Mostardi-Platt Eagan, Minn. office by the test crew. All final particulate sample analyses were performed at the Braun Intertec Corporation laboratory in Bloomington, Minn.

The test method applies to the determination of the condensible particulate matter (CPM) emissions from stationary sources. It is intended to represent condensible matter as material that condenses after passing through a filter and as measured by this method. (Note: The filter catch was analyzed according to Method 5, 40 C.F.R. 60<procedures.)

The CPM is collected in the impinger portion of Method 5 type sampling train. If applicable, the impinger contents are immediately purged after the run with nitrogen ($N_2$) to remove dissolved sulfur dioxide ($SO_2$) gases from the impinger contents. The impinger solution is then extracted with methylene chloride ($MeCl_2$). The organic and aqueous fractions are then taken to dryness and the residues weighed. A correction is made for any ammonia present due to laboratory analysis procedures. The total of both fractions represents the CPM.

Dry and wet test meters were calibrated according to methods described in the Quality Assurance Handbook, Sections 3.3.2, 3.4.2 and 3.5.2. Percent error for the wet test meter according to the methods was less than the allowable error of 1.0 percent. The dry test meters measured the test sample volumes to within 2 percent at the flow rate and conditions encountered during sampling.

The individual run results for the particulate capture system are shown in Table 2.

TABLE 2

TEST RESULTS SUMMARY
Individual Run Results - Pilot Dryer/Separator

|  | Run 1 | Run 2 |
|---|---|---|
| Test Date: | 10/20/2000 | 10/20/2000 |
| Sample Period: | 10:42–12:42 | 13:50–16:00 |
| Total Sampling Time (min): | 120 | 130 |
| PROCESS CONDITIONS |  |  |
| Average Duct Temperature (° F.): | 181 | 130 |
| Average Duct Velocity (ft/s): | 36.6 | 36.05 |
| Duct Moisture Content (% vol.): | 1.7 | 4.6 |
| Duct $O_2$ Content (% vol. dry): | 15.2 | 15.4 |
| Duct $CO_2$ Content (% vol. dry): | 5.3 | 5.2 |
| Wet Mole Weight (g · gmole): | 29.26 | 28.92 |
| Volume Flow Rate (ACFM): | 2344 | 2313 |
| Volume Flow Rate (SCFM): | 1932 | 2069 |
| Volume Flow Rate (DSCFM): | 1898 | 1974 |
| Product Feed Rate (lb/hr): | 2940 | 2900 |
| Moisture Added: | No | Yes |
| Natural Gas to Dryer (cu. ft/sec): | 0.093 | 0.119 |
| SAMPLE DATA |  |  |
| Sample Volume (dscf): | 62.764 | 73.027 |
| TSP Collected (mg) |  |  |
| Filterable: | 202.7 | 47.6 |
| Aqueous Condensible: | 15.3 | 12.5 |
| Organic Condensible: | 3.1 | 3.4 |
| Total: | 221.1 | 63.5 |

TABLE 2-continued

TEST RESULTS SUMMARY
Individual Run Results - Pilot Dryer/Separator

| | Run 1 | Run 2 |
|---|---|---|
| TSP Concentration (gr/dscf) | | |
| Filterable: | 0.0498 | 0.0101 |
| Aqueous Condensible: | 0.0038 | 0.0026 |
| Organic Condensible: | 0.0008 | 0.0007 |
| Total: | 0.0544 | 0.0134 |
| TSP Emission Rate (lb/hr) | | |
| Filterable: | 0.811 | 0.170 |
| Aqueous Condensible: | 0.061 | 0.045 |
| Organic Condensible: | 0.012 | 0.012 |
| Total: | 0.884 | 0.227 |

TABLE 3

| MATERIAL FORMULAS, ETC: | | NO WATER | NO WATER | WATER ADDED | WATER ADDED |
|---|---|---|---|---|---|
| RUN #: | START UP | 1 - T = 30 | 1 - T = 110 | 2 - T = 30 | 2 - T = 105 |
| HZ/RPM'S: | 47 Hz 1800 | 47 Hz 1800 | 47 Hz 1800 | 47 Hz 1800 | 47 Hz 1800 |
| HP/VOLTS: | 10/230 | 10/230 | 10/230 | 10/230 | 10/230 |
| NL AMPS: | 10.5 | 8.0 | 8.0 | 10.1 | 10.1 |
| LOAD AMPS: | — | 10.5 | 10.0 | 18.0 | 10.5 |
| FEEDER TYPE: | MIXER-FEEDER | MIXER-FEEDER | MIXER-FEEDER | MIXER-FEEDER | MIXER-FEEDER |
| FEEDER SPEED HZ/REEVES: | — | 32 Hz | 32 Hz | 32 Hz | 32 Hz |
| NOTES: | ROTOR 60 Hz | — | ROTOR 60 Hz | ROTOR 60 Hz | ROTOR 60 Hz |
| NOTES: | — | — | 50% Full 15.0 amp ½ the paddles on | 75% Full 11.9 amps | 60% Full 10.4 amps |
| LBS/HR: | — | 2940 | — | 2900 | 2900 |
| FEED ° F.: | Ambient | Ambient | 175.0° F. recycled product | 179° F. | 215° F. |
| MOISTURE IN: | 10.3% | 10.3% | 5.2% | Water out 1.2 gpm | 1.1 gpm |
| MOISTURE OUT: | — | 5.2% | 3.4% | — | — |
| PRODUCT ° F.: | — | 181° F | 1620° F. | 210° F. | 235° F. |
| AIR IN ° F.: | 270° | 500° F. | 360° F. | 400° F. | 405° F. |
| AIR OUT ° F.: | 215° F. | 205° F. | 215° F. | 245° F. | 265° F. |
| PITOT ° F.: | 159° F. | 158° F. | 167° F. | 105° F. | 111° F. |
| PITOT P: | 1.10 | 1.10 | 1.10 | 1.15 | 1.15 |
| DRYER P: | 6.0 | 8.0 | 8.0 | 7.5 | 5.5 |
| COLLECTOR P: | — | PCU | PCU | PCU | PCU |
| FAN P: | 17.0 | 22.0 | 22.0 | 25.0 | 25.0 |
| FAN AMPS (25 HP/480 V): | — | 30.0 | 30.0 | 31.5 | 31.5 |
| HZ/RPM'S: | 60/682 | 60/682 | 60/682 | 60/682 | 60/682 |
| HP/VOLTS | 50/480 | 50/480 | 50/480 | 50/480 | 50/480 |
| NL AMPS: | 18.1 | 18.1 | 18.1 | 18.1 | 18.1 |
| LOAD AMPS: | — | 18.3 | 18.2 | 18.4 | — |
| GAS CUFT/SEC.: | — | 10/112 | 10/103 | 10/84 | — |

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful for the meat meal rendering industry, those of skill in the art will readily understand and appreciate that the present invention has substantial use and provides many benefits in other industries as well. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

In addition to being directed to the embodiments described above and claimed below, the present invention is further directed to embodiments having different combinations of the features described above and claimed below. As such, the invention is also directed to other embodiments having any other possible combination of the dependent features claimed below.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A particulate separator comprising:
   a substantially hollow cylindrical shaped chamber having an inside wall, and drive shaft which extends through the chamber, the drive shaft having a plurality of radially projecting members which project into the chamber, a drive source, the drive source engaged to the drive shaft and constructed and arranged to provide the drive shaft with a predetermined rotation rate, a separator plate, the separator plate being positioned within chamber to divide the chamber into a first section and a second section;
   the first section having:
      an air stream inlet port, the air stream inlet port constructed and arranged to allow an air stream to enter the chamber, the air stream having particulate matter suspended therein, the first section constructed and arranged to separate at least a portion of the particulate matter from the air stream to form separated particulate; and
      an aperture, the aperture having a predetermined length which corresponds to a predetermined length of the first section, the aperture being covered by a gate, the gate being pivotally engaged to the chamber, the gate having a shape which corresponds to the cylindrical shape of the inside wall of the chamber, the gate having an open position and a closed position, in the open position the at least a portion of the separated particulate being directed into the aperture, in the closed position the gate being constructed and arranged such that any of the separated particulate which may have accumulated on the gate is removed by one or more of the plurality of radially projecting members;

the separator plate having:
an air outlet port, the air outlet port being positioned through the separator plate, the separator plate constructed and arranged to allow the air stream to pass through the air outlet port from the first section and into the second section while preventing separated particulate from leaving the first section;

the second section having:
at least one water inlet port, the at least one water inlet port constructed and arranged to place water inside the second section, the plurality of radially extending members which are positioned within the second section being constructed and arranged to mix at least a portion of the particulate suspended in the air stream with the water thereby creating water encapsulated particles; and
an outlet port, the outlet port constructed and arranged to allow the water encapsulated particles and the air stream to leave the chamber.

2. The particulate separator of claim 1 further comprising a separated particulate collector, the separated particulate collector positioned adjacent to the aperture, the separated particulate collector having a housing, the housing having a predetermined length, the housing containing a rotatable trough screw, the rotatable trough screw having a predetermined length, the predetermined length of the trough screw being less than the predetermined length of the housing.

3. The particulate separator of claim 2, the collector constructed and arranged to receive separated particulate from the aperture of the first section, the trough screw constructed and arranged to draw the separated particulate through the housing to an end of the housing where the separated particulate is allowed to accumulate thereby forming a continuously advancing plug of separated particulate.

4. The particulate separator of claim 1 wherein the air stream inlet port is in fluid communication with an air flow apparatus, the air stream traveling from the air flow apparatus to the chamber.

5. The particulate capture system of claim 4 wherein the air flow apparatus is selected from the group consisting of coolers, dryers, hammer mills, and any combination thereof.

6. The particulate separator of claim 5, further comprising:
a water tank, the water tank in fluid communication with the outlet port, the water encapsulated particles flowing from the outlet port to the water tank; and
a director plate, the air stream being directed by the director plate over the water encapsulated particles in the water tank.

7. The particulate separator of claim 6 further comprising a water pump and water pipe, the water pipe in fluid communication with the water tank and the air flow apparatus, the water pump constructed and arranged to pump a predetermined quantity of water encapsulated particles from the water tank, through the water pipe to the air flow apparatus.

8. The particulate capture system of claim 1, the drive source constructed and arranged to rotate the drive shaft at a rate between 500 and 2300 rpm.

9. The particulate capture system of claim 8, the drive source constructed and arranged to rotate the drive shaft at a rate of 1100 rpm.

10. The particulate capture system of claim 1 wherein the particulate capture system replaces a cyclone in a meal rendering system.

11. The particulate separator of claim 6, further comprising a water pump and water pipe, the water pipe in fluid communication with the water tank and the air flow apparatus, the water pump constructed and arranged to pump a predetermined quantity of water encapsulated particles from the water tank, through the water pipe to the cooler.

12. The particulate separator of claim 6, further comprising a water pump and water pipe, the water pipe in fluid communication with the water tank and the air flow apparatus, the water pump constructed and arranged to pump a predetermined quantity of water encapsulated particles from the tank, through the water pipe to a drain for disposal.

13. A method of treating heated meat meal product comprising the following steps:
exposing a predetermined quantity of heated meat meal product to a cooling system wherein an air stream is directed over the predetermined quantity of heated meat meal product;
directing the air stream into the particulate capture system of claim 1;
separating particulate matter from the air stream;
directing the water encapsulated particulate back to the cooling system;
spraying the predetermined quantity of heated meat meal product with the water encapsulated particulate;
releasing the air stream into atmosphere.

* * * * *